United States Patent
Durg et al.

[11] Patent Number: 6,069,972
[45] Date of Patent: May 30, 2000

[54] GLOBAL WHITE POINT DETECTION AND WHITE BALANCE FOR COLOR IMAGES

[75] Inventors: Ajaya V. Durg, Sunnyvale; Oleg Rashkovskiy, Cupertino, both of Calif.

[73] Assignee: Intel Corporation, Santa Clara, Calif.

[21] Appl. No.: 09/088,753

[22] Filed: Jun. 2, 1998

[51] Int. Cl.[7] ................................................. G06K 9/00
[52] U.S. Cl. ................................................ 382/167; 358/516
[58] Field of Search .......................... 382/162, 166, 382/167; 358/516, 522; 348/223

[56] References Cited

U.S. PATENT DOCUMENTS

| | | | |
|---|---|---|---|
| 5,038,205 | 8/1991 | Kondo et al. | |
| 5,181,105 | 1/1993 | Udagawa et al. | 358/80 |
| 5,481,302 | 1/1996 | Yamamoto | 348/223 |
| 5,581,298 | 12/1996 | Sasaki et al. | 348/222 |
| 5,606,630 | 2/1997 | Maeda et al. | 382/254 |
| 5,619,347 | 4/1997 | Taniguchi et al. | 358/516 |

OTHER PUBLICATIONS

IEEE Transactions on Consumer Electronics, vol. 41, No. 3 (Aug., 1995); Automatic White Balance for Digital Still Camera.

Computer Manufacturing Systems, vol. 9, No. 1 (1996); White Balance in Inspection Systems with a Neural Network.

*Primary Examiner*—Phuoc Tran
*Attorney, Agent, or Firm*—Blakely, Sokoloff, Taylor & Zafman LLP

[57] ABSTRACT

A methodology for white balancing a digital color image in its entirety without segmenting the image into sections. In one embodiment, the images (still or video) are captured and transferred to a computer, and software loaded in the computer then performs the white balancing methodology. A global white point is generated for a color image based on pixels of the image that are in a given percentile of frequency distribution, such as one that is part of a histogram. Pixel adjusting values are then computed for the image and used to white balance the entire image indiscriminately to improve its color quality.

16 Claims, 5 Drawing Sheets

| R | G | R | G |
|---|---|---|---|
| G | B | G | B |

8 sets of pixels,
1 component value &
1 component type per set

Fig. 4B

| R | G | R | G |
|---|---|---|---|
| G | B | G | B |

2 sets of pixels,
4 component values & up to
3 component types per set

Fig. 4C

| RGB | RGB | RGB | RGB |
|-----|-----|-----|-----|
| RGB | RGB | RGB | RGB |

8 sets of pixels,
3 component values &
3 component types per set

Identify white points in the color image based on the criteria for YUV components in equations (5-1)

514

Compute a global white point for the entire image by averaging Y, U, and V component values of the white points in step 510 (see also Fig. 4A)

518

Compute RGB values corresponding to the global white point ($Y_{ave}$, $U_{ave}$, $V_{ave}$) using equation (5-2)

524

Compute RGB adjusting values by simultaneously solving equations (5-3), (5-4), and (5-5), one adjusting value for each respective component type

528

Adjust each set of pixels in the image from YUV to Y'U'V' using equations (5-6) and (5-7)

Fig. 5

GLOBAL WHITE POINT DETECTION AND WHITE BALANCE FOR COLOR IMAGES

BACKGROUND

1. Field of the Invention

This invention is generally related to digital imaging systems and more particularly to techniques for detecting a white point and white balancing color images.

2. Related Art

Digital imaging systems are becoming increasingly popular, particularly due to the continuing decline in the cost of digital cameras and personal computers (PCs). Affordability is needed for the continued expansion of the digital imaging market, but the quality of digital color images is also an important consideration for the consumer.

A digital image frame is composed of a number of picture elements (pixels) that together represent the image of a captured scene. Each pixel has at least one pixel value representing the detected intensity of incident light of a particular color that was detected by a corresponding sensor element of an electronic color image sensor. Due to practical limitations in color sensor electronics, however, color images obtained using digital cameras do not accurately display the color content of the scene.

The color of an object recorded by a color sensor typically varies with the light source that illuminates the scene. The true color of the object is captured only if the proper illuminant, having a certain color spectrum, is present. For many sensors, daylight is the proper illuminant, such that an image captured by such a sensor of a white object illuminated with daylight will show the object in its true white color when displayed. However, when the same object is illuminated indoors with a household light bulb, the captured image will show the object as having a slightly reddish color due to the greater red content of light produced by incandescent light bulbs. Similarly, if the white object were illuminated with a fluorescent lamp, then the object in the captured image would have a bluish color. The human eye as an image sensor and the human visual system as a whole can correct for such a color distortion, such that the white object is seen as true white under a wide range of different illuminants. Image sensors, however, cannot inherently make such a correction.

Typically, color correction in imaging devices such as video cameras can be achieved by using certain techniques collectively known in the industry as white balancing. Such techniques have been used or proposed for use with video cameras and digital still cameras. These white balancing methods have been typically implemented as digital logic circuitry aboard the video camera or the digital still camera. Each image frame is white balanced prior to it being transferred outside the camera or stored on recording media such as a video cassette or a removable non-volatile memory.

While the implementation of white balancing in logic circuitry easily allows the transfer of image frames at sufficiently rapid frame rates for display as a video, the dedicated logic circuitry substantially increases the cost of manufacturing the imaging device. Moreover, the conventional white balancing methods referred to above partition an image frame into sections and compute white points and perform white balancing upon each section separately. When the white balanced image is subsequently displayed, undesirable artifacts may appear near the boundaries between such white balanced sections.

It would be desirable to have a white balancing technique that helps reduce the manufacturing cost of the imaging device and helps reduce the incidence of artifacts in an image, while at the same time support a sufficiently rapid frame rate for video.

SUMMARY

The invention in one embodiment is directed at a method of identifying respective sets of pixel component values from a number of pixel component values defining a color image, each respective set having pixel component values of a component type, with at least a first one of the sets having pixel component values in a predefined percentile of pixel component values defining the color image. Next, a global white point for the color image is generated, the global white point having values with each value being related to the pixel component values in the respective set.

DETAILED DESCRIPTION

As briefly summarized above, the invention in one embodiment is directed at a method of detecting a global white point and adjusting color images to obtain white balance in the images. The method may be implemented in software thus avoiding the need for dedicated logic circuitry for white balancing in the imager. Moreover, the method does not separate an image into regions to determine a different white point for each region. Rather, a global white point is computed for the entire image. This helps reduce the incidence of artifacts in the white balanced image such as those discussed above in the Background section. Also, this disclosure includes a software-implementable white balance method that permits video at an acceptable frame rate to be displayed on a PC equipped with an Intel Pentium II® processor.

Figure 1:
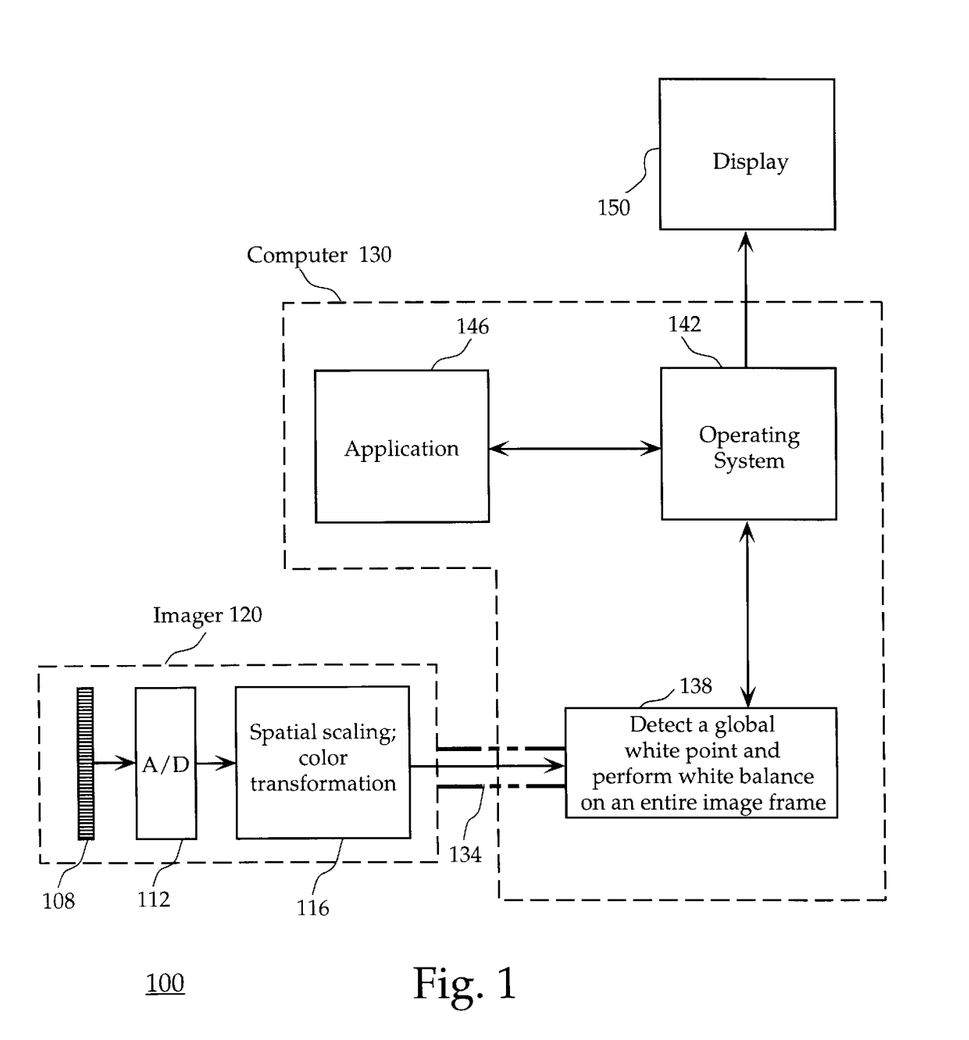
FIG. 1 is an imaging system configured according to an embodiment of the invention.
Figure 2:
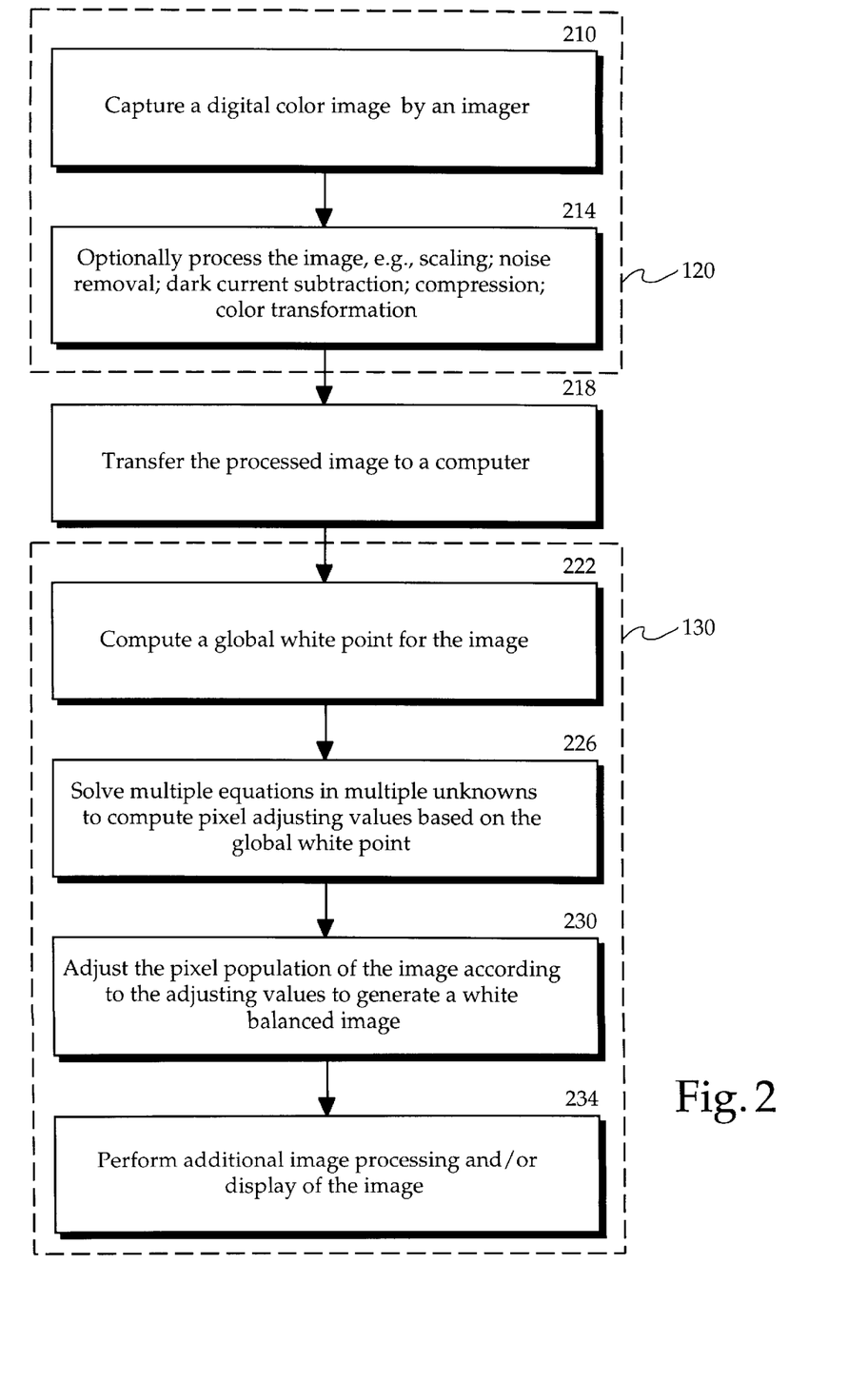
FIG. 2 shows operations performed by the system of FIG. 1.

An embodiment of the invention is shown in FIGS. 1 and 2, where FIG. 1 is an exemplary imaging system 100 and FIG. 2 lists the operations performed by the system. The two figures will be described concurrently. The imaging system 100 comprises an imager 120 coupled to a computer 130 and a display 150 via a transfer device 134. The imager 120 in this particular embodiment may be part of a digital camera, although a variety of other types of cameras or imaging devices may alternatively be used. The image sensor 108 may be a complimentary metal oxide semiconductor (CMOS) active pixel sensor. Other types of sensor technologies may be used, such as those based on charge coupled devices (CCDs) whose images would benefit from white balancing.

Figure 4A:
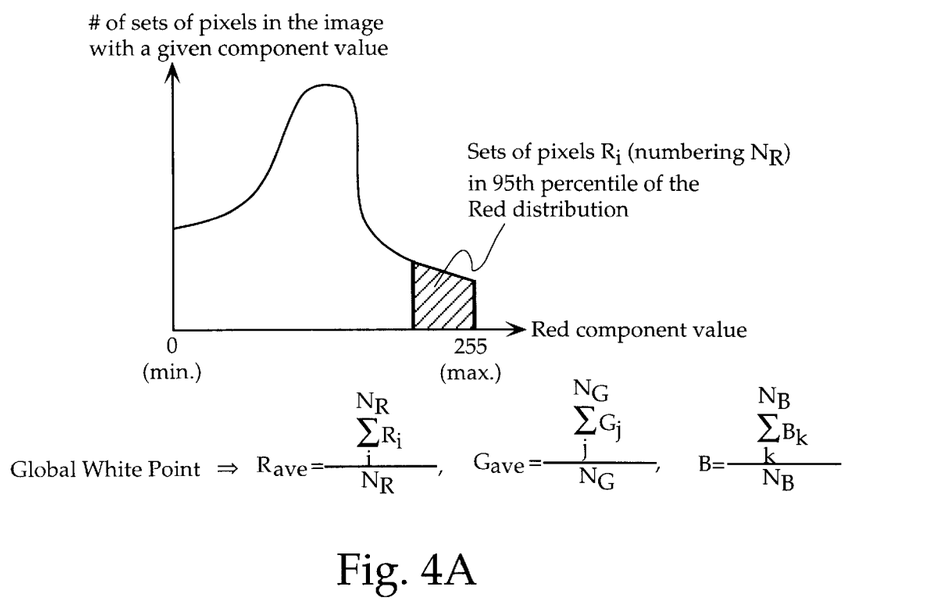
FIG. 4A shows a histogram for a particular component type together with expressions for computing a global white point in RGB space.
Figure 4B:
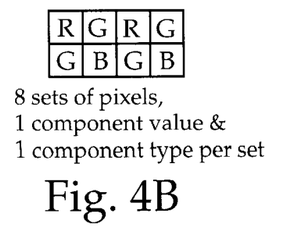
FIGS. 4B–4D are various definitions of a set of pixels and their components used in different embodiments of the invention.
Figure 4C:
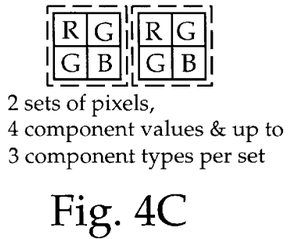
Figure 4D:
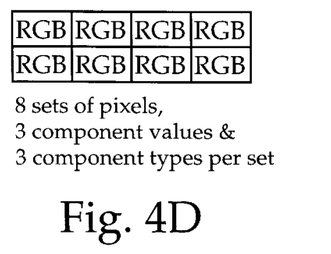

Using an analog to digital (A/D) converter 112, the sensor output is converted from analog form into digital pixels having component values that define a captured color image of the scene in a given color space, as in step 210 of FIG. 2. Some self-explanatory definitions for pixels and pixel component values to be used in various embodiments of the invention are shown in FIGS. 4B–4D.

Once captured by the imager 120, operation continues with step 214 where the color image may then be processed by image processing block 116 prior to being transferred to the computer 130. For instance, the image may be spatially scaled into a smaller size and/or compressed in order to reduce the resources required for its transfer to the computer. The image may also be transformed into a color space different than the native one used by the image sensor 108. For instance, the image sensor 108 may detect RGB colors whereas the image processing application software 146 in the computer 130 would require color images in YUV space as defined by CIE (Committee Internationale de l'Eclairage).

After the optional processing 116 (corresponding to step 214) has been performed, operation continues with step 218 where the images are transferred to the computer 130 using the transfer device 134. In a particular embodiment, the transfer device 134 features a computer peripheral bus configured according to industry accepted specifications such as Universal Serial Bus (USB) 1.0 Final Draft Revision, dated Nov. 13, 1995, or IEEE 1394–1995. Those embodiments are also suitable for transferring multiple images at a sufficiently rapid frame rate to be displayed as a movie. Other embodiments may use a non-volatile removable memory such as a flash memory card to store and transfer still color images to the computer. In one embodiment, the computer 130 can be a personal computer (PC), such as one configured with the Windows user interface by Microsoft® Corp. Other combinations of hardware and software, including portable systems such as a notebook computer, kiosks, network computers, and set-top boxes may alternatively be used for the computer 130.

Once the image is received, decompressed (if necessary) and stored in the computer, operation proceeds with steps 222–230 in which a white balance method described further below is performed on the entire image to yield a global white point and a white balanced color image. With video, the white balance may be performed separately on each image frame of a sequence of frames defining the video.

In step 222, the global white point is computed by software 138 in the computer 130. The software 138 can be part of a camera driver if the images were captured by an imager inside a digital camera. The global white point is obtained after analyzing the entire image for pixel component values that are within a specified range of values or percentile of distribution, as will be appreciated below with specific examples in FIGS. 3–5. After the global white point is obtained, operation continues with step 226 in which a number of adjusting values are computed by solving multiple equations in multiple unknowns using the global white point. The pixel population of the image is then adjusted, indiscriminately for pixel components of each type, according to the adjusting values to generate a white balanced image.

Once the white balanced image has been determined, additional image processing may be performed in step 234, such as color interpolation or recovery. As will be recognized below, color interpolation may alternatively be performed before the image data is transferred to the computer, or concurrently with steps 222–230.

Figure 3:
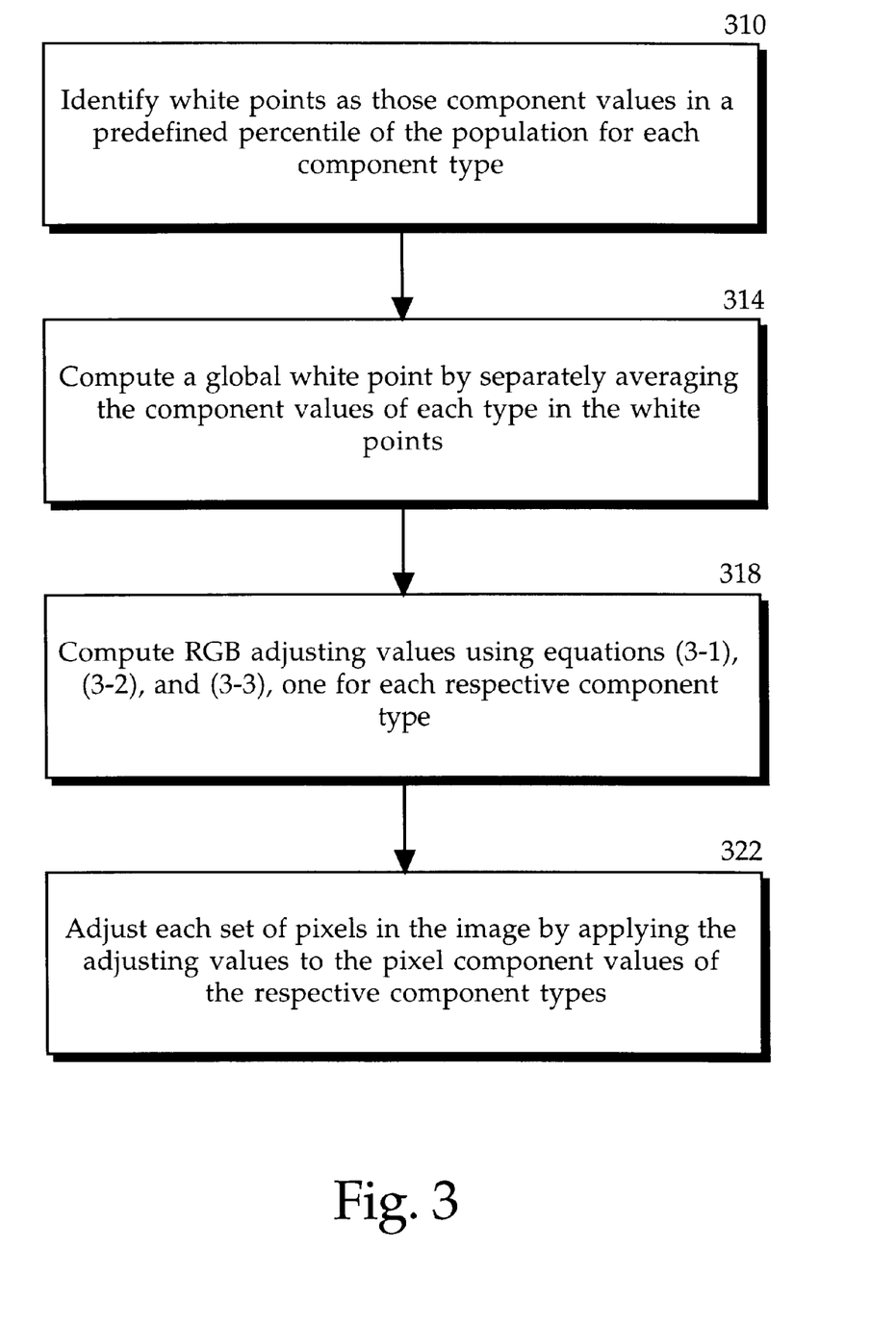
FIG. 3 outlines the operations of a white balancing method in RGB space according to another embodiment of the invention.
Figure 5:
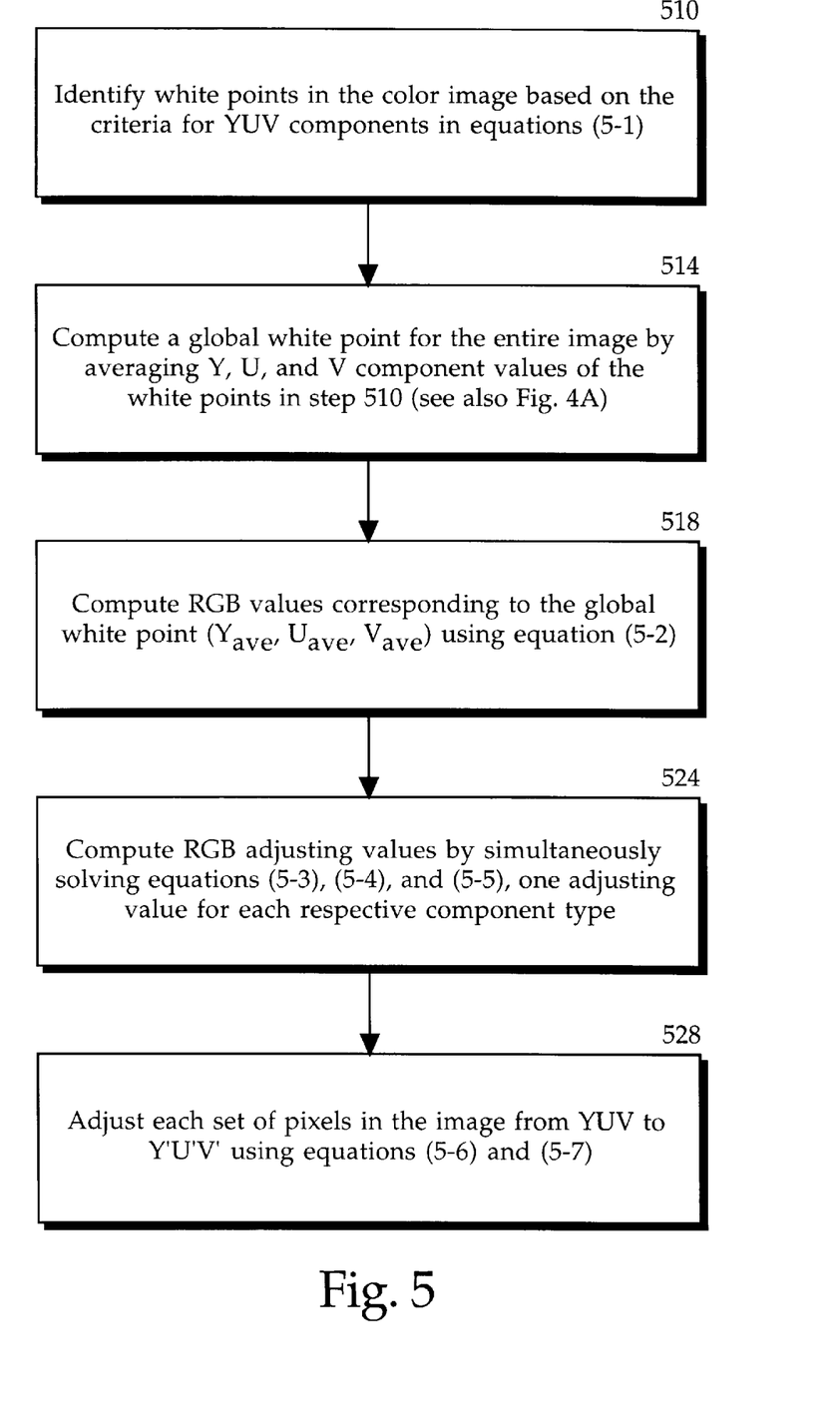
FIG. 5 outlines a white balancing method performed on an image in YUV space according to another embodiment of the invention.

FIGS. 3 and 5 illustrate further embodiments of the invention as white balancing methodologies in two different color spaces. A computer program using any suitable high level language (e.g., C) may be written based on the Figures and the discussion below to implement the methodology. The computer program can then be translated into instructions for a processor, and can be stored on various types of machine-readable media, including semiconductor program memory in the computer 130 and a mass storage device such as a magnetic disk drive. The instructions may be transferred into the program memory of computer 130 from a removable media such as a compact disc or downloaded from a remote location via a computer network.

FIG. 3 describes a methodology of the invention in RGB space where each set of pixels in the color image includes pixel component values corresponding to one or more of the three colors Red, Green, and Blue. Other alternative color spaces might also be used with a slight modification of the RGB methodology, such as Cyan, Magenta, Yellow (CMY). Operation begins with step 310 of FIG. 3 where a number of respective percentiles are selected, one for each component type, as shown by an exemplary histogram in FIG. 4A. For RGB space, the 95th percentile was selected for each component type being, in the case of RGB, a separate color. This means the 5% of component values in the color image having the highest R, G, and B values within the exemplary 0–255 range are selected to compute the global white point. Other percentile values may alternatively be used. Component values in the selected percentile can be viewed as representing the 'most white' pixels of the entire pixel population defining the color image. Thus, the R, G, and B values of the sets of pixels in the image having R values in the selected percentile of the R population in the image, G values in the selected percentile of the G population in the image, and B values in the selected percentile of the B population in the image are considered white points. Operation then continues with step 314.

In step 314 of FIG. 3, the global white point ($R_{ave}$, $G_{ave}$, $B_{ave}$) is computed as three values, one for each color or component type. For this embodiment, each value is an average of the component values of the respective percentile selected as white points above in step 310. An example for Red is shown in FIG. 4A. Operation then continues with step 318 in FIG. 3.

Once the global white point has been determined, using the technique described above or an equivalent, a number of adjusting values are computed in step 318. These will be used to actually white balance the color image by, for example, amplifying or attenuating the component values of each set of pixels defining the image. In particular, when applied to the global white point, the adjusting values will transform the values of the global white point into an adjusted global white point that is closer in color to an ideal white point having equal R, G, and B values.

The global white point is thus sought to be adjusted or brought closer to the ideal white point by adjusting individual R, G, B values according to gr, gg, and gb to be determined below. An adjusted white point ($R'_{ave}$, $G'_{ave}$, $B'_{ave}$) will be given by $$R'_{ave}=gr*R_{ave}, G'ave\ gg*G_{ave}, B'_{ave}=gb*B_{ave} \quad (3-1)$$

gr, gg, gb are chosen such that $$R'_{ave}=G'_{ave}=B'_{ave}, \quad (3-2)$$

and the luminance of the adjusted global white point is unchanged, i.e., $$Y'_{ave}=Y_{ave} \quad (3\text{-}3)$$

where $$Y_{ave}=ay*R_{ave}+by*G_{ave}+cy*B_{ave}, \text{ and}$$

$$Y'_{ave}=ay*R'_{ave}+by*G'_{ave}+cy*B'_{ave}$$

with ay, by, and cy being known coefficients for converting from RGB space to Y, per CCIR Rec 601 (International Radio Consultative Committee, 1990)

Solving the equations (3-1) through (3-3) above yields:

$$gr = Y_{ave}/([ay+by+cy]*R_{ave}),$$

$$gg = Y_{ave}/([ay+by+cy]*G_{ave}),$$

$$gb = Y_{ave}/([ay+by+cy]*B_{ave})$$

Once the adjusting values gr, gg, and gb have been determined, operation continues with step 322. There, the R, G, B values of each set of pixels in the image are then multiplied by gr, gg and gb, respectively, as obtained in step 318. Thus, the presumably white regions in the image turn to true white after white balancing, and the regions with other colors are adjusted proportionately. Doing so allows the white colors in the scene to be displayed in their true white color, with the other colors of the scene adjusted proportionately. Note that the adjusting value for each component type is applied indiscriminately to all component values of that type that define the color image. The pixel population was white balanced indiscriminately and in its entirety, without spatially dividing the image into regions, thus reducing the incidence of artifacts such as those in the white balanced images discussed above in the Background section.

An embodiment of the white balancing method of the invention was described above using the RGB color space. FIG. 5 illustrates another embodiment of the invention for white balancing, this time in YUV space. In this embodiment, the color image is in YUV format, where Y is the luminance component associated with each set of pixels and U and V are the color components. An assumption is made that the global white point to be found should have a relatively high luminance Y and that its U and V components be generally close to 128 which is the middle of the full range 16–240 and that corresponds to an ideal white color.

Operation begins in step 510 of FIG. 5 where white points of the color image being pixel components meeting these criteria are collected:

Y values in the selected (e.g., 95th) percentile of the (5-1)
Y population in the image $U = 128 + Delta, V = 128 + Delta,$ where Delta =+/−20 may be experimentally determined based on viewing the resulting white balanced image. The global white point ($Y_{ave}$, $U_{ave}$, $V_{ave}$) is obtained by averaging the Y, U, and V values, respectively, of the white points that satisfy the requirements of (5-1) above. The Y group may include all component values in the 95th percentile of the Y population, while the U and V groups include values in the range 128±20. Of course, percentiles other than 95% and Delta values other than ±20 may be selected. The percentiles, however, are generally near the high end of the Y distribution and normally no less than 90%.

Once the global white point has been determined in step 514 above, the methodology described above for the RGB space may also be used to perform the actual white balancing in YUV space as indicated in steps 518–528 of FIG. 5. In step 518, the global white point ($Y_{ave}$, $U_{ave}$, $V_{ave}$) in YUV space is converted to an RGB equivalent using:

$$\begin{bmatrix} R_{ave} \\ G_{ave} \\ B_{ave} \end{bmatrix} = \begin{bmatrix} ar & br & cr \\ ag & bg & cg \\ ab & bb & cb \end{bmatrix} * \begin{bmatrix} Y_{ave}-16 \\ U_{ave}-128 \\ V_{ave}-128 \end{bmatrix} \quad (5\text{-}2)$$

where ar, br, cr, ag, bg, cg, ab, bb, cb are known constants to convert from YUV to RGB per CCIR Rec 601.

With, gr, gb and gg being RGB adjusting values to be determined in step 524, the adjusted white point ($R'_{ave}$, $G'_{ave}$, $B'_{ave}$) is given by $$R'_{ave}=gr*R_{ave}, G'_{ave}=gg*G_{ave}, B'_{ave}=gb*B_{ave} \quad (5\text{-}3)$$

gr, gg, gb are chosen such that $$R'_{ave}=G'_{ave}=B'_{ave} \quad (5\text{-}4)$$

and the luminance $$Y_{ave}=Y'_{ave} \quad (5\text{-}5)$$

is unchanged, where $$Y_{ave}=ay*R_{ave}+by*G_{ave}+cy*B_{ave}$$

$$Y'_{ave}=ay*R'_{ave}+by*G_{ave}+cy*B'_{ave}$$

(ay, by, cy are known coefficients to convert from RGB to YUV per CCIR Rec 601)

Solving the equations (5-3) through (5-5) yields the adjusting values for the YUV embodiment:

$$gr=Y_{ave}/([ay+by+cy]*R_{ave}),$$

$$gg=Y_{ave}/([ay+by+cy]*G_{ave}), \quad (5\text{-}6)$$

$$gb=Y_{ave}/([ay+by+cy]*B_{ave})$$

Once the adjusting values gr, gg, and gb have been determined in step 524, operation continues in step 528 where the YUV values of each set of pixels in the image are adjusted to Y'U'V' using the following series of matrix transformations:

$$\begin{bmatrix} Y'-16 \\ U'-128 \\ V'-128 \end{bmatrix} = \begin{bmatrix} ay & by & cy \\ au & bu & cu \\ av & bv & cv \end{bmatrix} * \begin{bmatrix} R' \\ G' \\ B' \end{bmatrix}$$

where $$\begin{bmatrix} R' \\ G' \\ B' \end{bmatrix} = \begin{bmatrix} gr*R \\ gg*G \\ gb*B \end{bmatrix} \quad (5\text{-}7)$$

with $$\begin{bmatrix} R \\ G \\ B \end{bmatrix} = \begin{bmatrix} ar & br & cr \\ ag & bg & cg \\ ab & bb & cb \end{bmatrix} * \begin{bmatrix} Y-16 \\ U-128 \\ V-128 \end{bmatrix}$$

where ay, by, cy, au, bu, cu, av, bv, cv are constants to convert from RGB to YUV per CCIR Rec 601. This yields a white balanced image in the YUV space.

As was mentioned above, the white balancing methodologies of the invention may be performed before or after color interpolation. For instance, FIGS. 4B–4D depict a number of definitions for a "set of pixels", including some that are used with color images that have been subjected to a color interpolation algorithm. In FIG. 4B, eight sets of pixels are shown, where each set is defined as having one component value of one type (color). This definition is suitable to represent raw image sensor data generated by an image sensor having an RGB color filter array (CFA), where the sets of pixels have riot been color interpolated. Another set of pixels is shown in FIG. 4C where each set has up to four component values of up to three types. This definition may be used to represent image blocks such as those used in the joint photographic experts group (JPEG) format. Yet another definition is shown in FIG. 4D where each set has three component values corresponding to three separate types. This definition may be used with image sensor data that has been color interpolated. Other definitions for a "set of pixels" to be used in the white balancing methods of the invention described may be developed by those of ordinary skill in the art.

The embodiments of the invention described above are, of course, subject to other variations in structure and implementation. For instance, the white balancing methodologies illustrated using a 0–255 range of RGB or YUV pixel component values may be adapted to different ranges and different color spaces by those of ordinary skill in the art. The scope of the invention should be determined not by the embodiments illustrated but by the appended claims and their legal equivalents.

What is claimed is:

1. An imaging system comprising:
   computer configured with instructions that when executed cause the computer to perform the steps of:
   a) identifying a plurality of respective sets of pixel component values from a plurality of pixel component values defining a color image, each respective set having pixel component values of a component type, at least a first one of said sets having pixel component values in a predefined percentile of pixel component values defining the color image; and
   b) generating a global white point for the color image, the global white point being a plurality of white values, each white value being related to the pixel component values in the respective set;
   imager for capturing the color image; and
   transfer device for transferring the color image from the imager to the computer.

2. The system of claim 1 wherein the transfer device comprises a non-volatile removable storage device.

3. The system of claim 1 in combination with a digital camera, wherein the imager is part of the camera.

4. The system of claim 1 wherein the computer is configured to decompress a received color image file to obtain the color image before performing step a), the received color image file having been transferred from the imager.

5. A method, comprising:
   a) identifying a plurality of respective sets of pixel component values from a plurality of pixel component values defining a color image, each respective set having pixel component values of a component type, at least a first one of said sets having pixel component values in a predefined percentile of pixel component values defining the color image;
   b) generating a global white point for the color image, the global white point being a plurality of white point component values, each white point component value being related to the pixel component values in the respective set c) computing a plurality of adjusting values using the global white point, each adjusting value corresponding to the respective component type; and
   d) multiplying the plurality of pixel component values defining the color image by the plurality of adjusting values to obtain adjusted pixel component values.

6. The method of claim 5 wherein the first respective set comprises red (R) component values, a second respective set has green (G) component values, and a third respective set comprises blue (B) component values.

7. The method of claim 5 wherein the first respective set comprises luminance (Y) component values, a second respective set comprises U component values, and a third respective set comprises V component values, the U and V component values being within respective ranges.

8. The method of claim 7 wherein the respective ranges are selected based on the color content of the color image as displayed and perceived by a human.

9. The method of claim 5 wherein each of the plurality of white point component values are related to an average of the pixel component values in the respective set and the adjusting values are selected such that each of a plurality of adjusted white point component values, obtained by adjusting a corresponding one of the plurality of white point component values, is equal to another.

10. The method of claim 5 further comprising:
    performing a color interpolation algorithm upon the adjusted pixel component values.

11. The method of claim 5 further comprising:
    performing a color interpolation algorithm before identifying the plurality of respective sets, to obtain the plurality of pixel component values.

12. The method of claim 5 further comprising:
    repeating steps a)–d) with a plurality of color images defining a video stream.

13. An article comprising:
    a machine-readable medium having instructions that cause a processor to:
    a) identify a plurality of respective sets of pixel component values from a plurality of pixel component values defining a color image each respective set having pixel component values of a component type, at least a first one of said sets having pixel component values in a predefined percentile of pixel component values defining the color image;
    b) determine a global white point for the color image, the global white point being a plurality of white point component values, each white point component value being related to the pixel component values in the respective set
    c) compute a plurality of adjusting values using the global white point, each adjusting value corresponding to the respective component type; and
    d) multiply the plurality of pixel component values defining the color image by the plurality of adjusting values to obtain adjusted pixel component values.

14. The article of claim 13 wherein the machine-readable medium further comprises instructions that cause the computer to perform the further steps of:
    repeating steps a)–d) with a plurality of color images defining a video.

15. The article of claim 13 wherein the instructions are part of driver software for a digital camera.

16. The article of claim 13 wherein each of the plurality of white point component values are related to an average of the pixel component values in the respective set and the adjusting values are selected such that each of a plurality of adjusted white point component values, obtained by adjusting a corresponding one of the plurality of white point component values, is equal to another.

* * * * *

UNITED STATES PATENT AND TRADEMARK OFFICE
CERTIFICATE OF CORRECTION

PATENT NO.    : 6,069,972
DATED         : May 30, 2000
INVENTOR(S)   : Durg et al.

It is certified that error appears in the above-identified patent and that said Letters Patent is hereby corrected as shown below:

Column 4,
Line 62, afater "$G'_{ave}$" and before "$gg$", insert -- = --.

Column 7,
Line 11, delete "riot", insert -- not --.

Signed and Sealed this

Fourteenth Day of January, 2003

JAMES E. ROGAN
*Director of the United States Patent and Trademark Office*